Feb. 10, 1953     C. L. JOHNSON     2,627,906
FUEL METERING SYSTEM FOR INTERNAL-COMBUSTION ENGINES
Filed Feb. 14, 1949
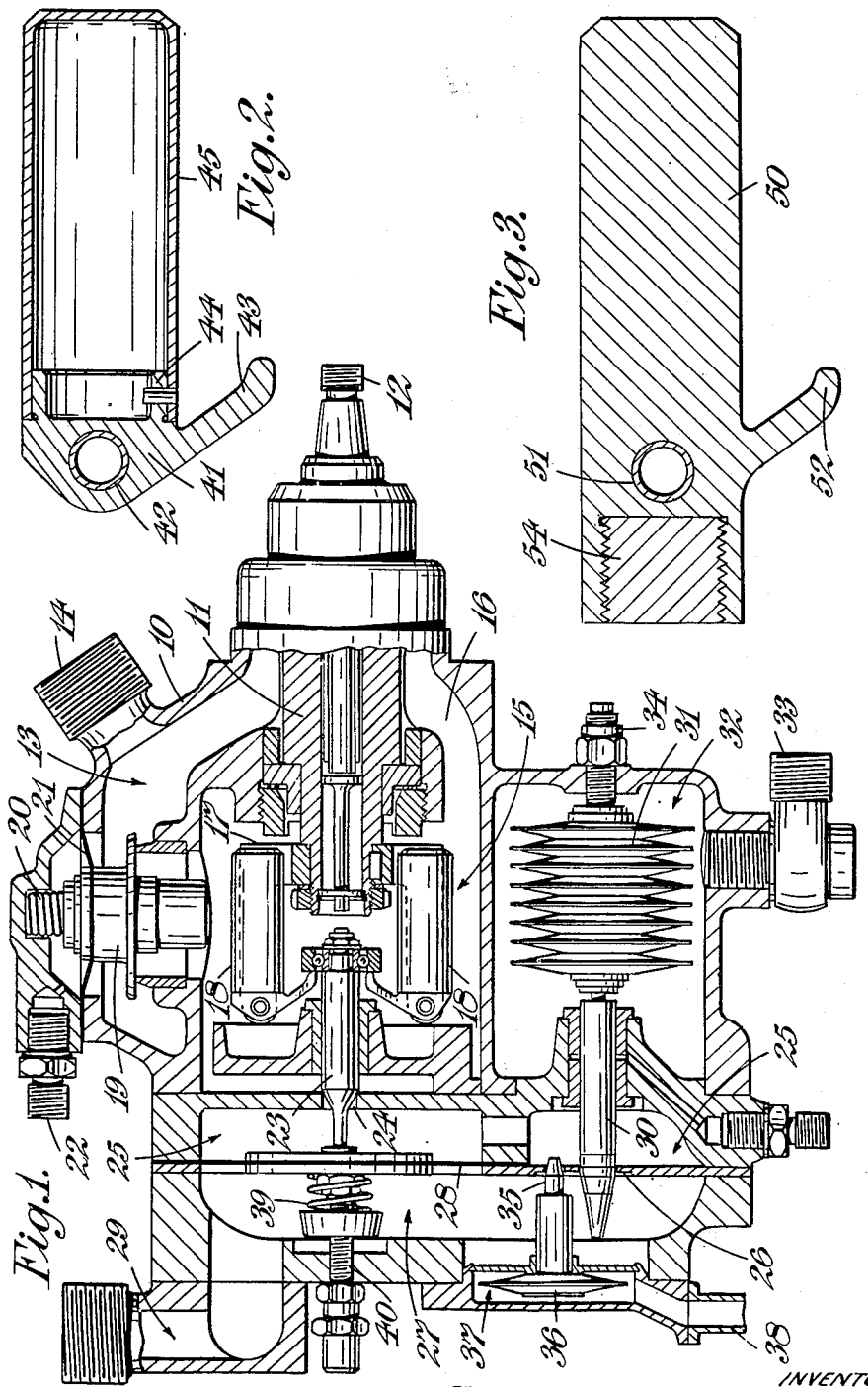
INVENTOR
*CHRISTOPHER L. JOHNSON*
by Wilkinson Mawhinney
Attorneys

UNITED STATES PATENT OFFICE 2,627,906

FUEL METERING SYSTEM FOR INTERNAL-COMBUSTION ENGINES

Christopher Linley Johnson, Allestree, Derby, England, assignor to Rolls-Royce Limited, Derby, England, a British company Application February 14, 1949, Serial No. 76,328
In Great Britain February 23, 1948

4 Claims. (Cl. 158—36)

This invention relates to fuel metering systems for internal combustion engines and is concerned with metering systems of the kind in which there is provided orifice means for metering the fuel, the volumetric flow of fuel through which orifice means is proportional approximately to the square root of the pressure difference across the orifice means, and there is also provided a centrifugal governor for controlling the pressure difference to be approximately proportional to the square of the rotational speed of the engine with which the fuel metering system is associated.

Fuel metering systems of this kind are employed in association with reciprocating internal combustion engines and can also be employed with internal combustion turbine engines.

Fuel metering systems as employed hitherto have operated to control the volumetric flow of fuel to the engine, so that with a given setting of the fuel metering device the mass flow to the engine is dependent on the temperature of the fuel, the higher the temperature the less the mass flow to the engine. Since the amount of energy which can be obtained from a fuel is dependent on its calorific value and therefore on its weight, it will be clear that the amount of heat energy obtained from the fuel can vary with known fuel metering systems according to the temperature of the fuel, the higher the temperature of the fuel the lower the energy obtained by burning of the fuel. For instance if an aircraft operates both under tropical conditions where the fuel temperature may be +60° C. and also under extreme arctic conditions where the temperature of the fuel may be −40° C. a variation in fuel density of about 13.6% may occur, so it will be appreciated that for a given volumetric fuel flow, due to a given setting of the fuel metering system, the amount of energy obtained with that given setting of the fuel metering system may vary considerably under the differing operating conditions.

Also the density of hydrocarbon fuels varies considerably with the percentage hydrogen content while the calorific value changes with density much less rapidly, so that if a fuel metering system supplies a fixed volumetric flow of fuel of variable composition the amount of heat energy supplied will vary with the fuel density in the same sense as for density variations due to temperature, but by an amount of slightly less magnitude.

In one particular known construction of fuel metering means the governor weights of the centrifugal governor are immersed in the fuel, and it can be shown that for any selected rotational speed of the engine, the mass flow of fuel (M) is related to the fuel density $\rho_1$ and the density $\rho_2$ of the material from which the governor weights are made, by the expression $M = K\sqrt{\rho_1 (\rho_2 - \rho_1)}$ (where K is a constant)

Thus it can be seen that the densities of both the fuel and the governor weights affect the mass flow of fuel to the engine. Now in this particular construction of fuel metering system the governor weights were made from brass or steel or another material having a high density compared with that of the fuel and consequently the change in the magnitude of the factor $(\rho_2 - \rho_1)$ as a result of the change of $\rho_1$ is relatively insignificant, the change in mass flow thus mainly dependent on the change in the density of the fuel.

It is an object of the present invention to provide a fuel metering system of the kind referred to in which the variation in the mass flow due to changes in the fuel temperature or composition, and therefore of the fuel density, is reduced.

According to the present invention in a fuel metering system of the kind referred to in which the governor weights are immersed in the fuel, the governor weights are arranged to have an effective density not exceeding 5 times and preferably approximately twice the density of the fuel.

By the "effective density of a weight" is meant the density of a weight having the same shape and volume and of uniform density throughout which would produce the same governing load as the given weight under a given centrifugal acceleration.

This may be obtained according to preferred arrangements of the invention either by:

(a) Making the weight of uniform density throughout, such uniform density being not more than 5 times the density of the fuel:

(b) Making the weight of hollowed and sealed form so that its effective density as defined above is not more than 5 times the density of the fuel: or (c) Making the weight of composite form to have one portion of uniform density as mentioned in (a) or effective density as mentioned in (b) on one side of the pivot axis and a second portion of higher density on the other side of the pivot axis, thereby to produce an overall effective density of the weight as previously defined.

In the following description the effective density of the weight is referred to as $\rho_2$.

With a fuel metering system of this invention the change in the magnitude of the factor $(\rho_2 - \rho_1)$ in the expression quoted above as a result of a change in the value of $p_1$ is relatively significant and decreases with an increase of $p_1$ so that the square root of the product $p_1(p_2-p_1)$ remains approximately constant when the value of $p_2$ is approximately twice $p_1$. Thus the variation of the mass flow of fuel M with changes of $p_1$ can be substantially reduced as compared with changes in mass flow of fuel with known metering devices by appropriately selecting the value $p_2$ in accordance with the invention.

It should be noted that changes in the value of $p_2$, that is the effective density of the governor weights, may normally be neglected, being small as compared with changes in the value of $p_1$. If, however, extreme accuracy is required in the control of the mass flow of fuel, changes in the value of $p_2$ can be compensated for by the initial selection of the value of $p_2$.

The governor weights may be made from a material which itself has a low density, for example, they may be made from a reinforced synthetic resin (which is resistant to fuel) or from a low density metal such as magnesium.

Alternatively, the relatively low effective density of the governor weights may be obtained by making the weights of a hollow sealed form so that although the material from which the weights are made may have a high density, the effective density of the governor weights themselves is not more than 5 times and preferably 2 times the density of the fuel in which they are to be immersed.

As a further alternative, a relatively small part of the weight on the opposite side of the pivot to the main body of the weights may be of relatively high density compared with that of the main body so that the weights have an effective density not more than five times, and preferably approximately twice the density of the fuel in which they are to be immersed.

One arrangement of fuel metering device according to this invention will now be described with reference to the accompanying drawings in which:

Figure 1 is a diagrammatic section through the fuel metering device, and

Figure 2 is a section through one form of governor weights suitable for use with the fuel metering device of Figure 1.

Figure 3 illustrates another form of weight suitable for use in accordance with the invention.

Referring to Figure 1, there is illustrated a fuel metering device of the kind to which this invention relates and of the kind such as is described and claimed in British patent specification No. 611,312.

The fuel metering device comprises a casing or body 10 divided into a number of chambers by internal walls.

Supported within the casing there is a vane type pump 11 carried on a spindle 12 by which the pump is driven from the engine with which the fuel metering device is associated. The pump 11 draws fuel from a chamber 13 fed through an inlet union 14 and delivers the fuel into a chamber 15 through a delivery passage 16. Arranged within the chamber 15, there is a centrifugal governor comprising a carrier 17 supported on the pump spindle and a series of governor weights 18 the nature of which will be described fully hereinafter. The governor being connected to the pump spindle is rotated at the same speed as the pump and therefore at a speed proportional to the engine speed.

A relief valve 19 is provided between the chamber 15 and the fuel inlet chamber 13 and is arranged so that the fuel metering device is capable of passing the pump delivery at high engine speeds without the pressure at which the valve 19 is selected to operate being exceeded. The valve 19 is loaded by a spring 20 and is connected to a diaphragm 21 which has an effective area equal to the seat area of the relief valve 19, so that the operation of the relief valve is unaffected by the fuel intake pressure. The opposite side of the diaphragm 21 is vented to the air intake of the engine through a connection 22, so that leakage of fuel externally of the engine is avoided should the diaphragm 21 become punctured.

The governor weights 18 are arranged to act upon a valve 23 controlling an orifice 24 through which the fuel leaves the chamber 15 and enters a chamber 25.

The chamber 25 is formed in two parts and the wall of the chamber comprises a plate 26 in which two valve controlled orifices are formed leading to a chamber 27, and also comprises a diaphragm 28 to which the valve 23 is operatively connected. Fuel entering the chamber 27 through the orifices in the plate 26 passes to the engine through a fuel outlet 29.

One of the orifices in the plate 26 is controlled by a needle valve 30 which is itself controlled as to its position by a stack of capsules 31 located in a chamber 32. This chamber 32 is subjected to the engine boost pressure (as determined by the engine supercharger) through a connection 33. The capsules 32 are responsive to variations in the boost pressure and are conveniently formed in two groups comprising, for example, a stack of 6 evacuated capsules and a stack of 2 capsules which are open internally to the ambient atmosphere which is the back pressure against which the engine is working, the connection to the interior of the capsules being conveniently taken through the adjustable abutment 34 for the stack of capsules. The arrangement of the capsules and valve is such that as the engine boost pressure increases the valve 30 lifts and allows a greater quantity of fuel to flow from the chamber 25 into the chamber 27 through the orifice controlled by the valve.

The other orifice in the plate 26 is controlled by a needle valve 35 which is connected to an evacuated capsule 36 accommodated in a chamber 37 which communicates by means of a pipe connection 38 with a temperature-responsive bulb in the engine induction pipe. The bulb, the pipe 38 and chamber 37 will be filled with a non-volatile liquid, so that the capsule 36 expands and contracts with variations of the temperature in the engine induction pipe and therefore the quantity of fuel which flows from the chamber 25 into the chamber 27 through the orifice controlled by the valve 35 will be dependent upon the temperature in the engine induction pipe. The arrangement is such that as the temperature in the engine induction pipe increases the valve 35 will be closed.

As was stated above the valve 23 is operatively connected to the diaphragm 28 and the arrangement is such that the setting of the valve 23 is in part determined by the pressures existing in the chambers 25 and 27 which are in turn determined by the restriction afforded by the orifices controlled by the needle valves 30 and 35. The diaphragm is in part loaded by a control spring 39 which has an adjustable abutment 40 by which the slow running setting of the valve 23 can be effected.

In known constructions of the fuel metering device as described above the governor weights 18 were made from a material having a high density, for example, the governor weights were made from brass or steel which have a density of between 7 and 9. As a result the changes in the mass flow of fuel through the metering device and thus to the engine, due to changes in the temperature of the fuel and therefore to changes of its density, were substantial.

According to this invention, however, the governor weights 18 are so arranged to have an effective density which is not greater than 5 but which is preferably approximately equal to twice the density of the fuel passing through the fuel metering device, so that changes in the density of the fuel do not have any substantial effect on the mass flow of fuel through the fuel metering device as determined by the expression $M=K\sqrt{\rho_1(\rho_2-\rho_1)}$ (where K is a constant)

For this purpose the governor weights may be formed as solid bodies from a material such as magnesium or a reinforced synthetic resin having a density of the order of 1.3 to 2.0 gms. per cubic centimetre.

In Figure 2, an alternative form for the governor weight is shown and it comprises a part 41 provided with a bearing bush 42 by which the governor weight is mounted on the carrier 17 and a lateral finger 43 through which the governor weight acts on the valve 23. The part 41 is provided with an annular neck 44 providing a spigot to engage within the open end of a hollow cylinder 45 the opposite end of which is closed. The cylinder is pinned to the neck 44 and the joint between the neck and the cylinder 45 is sealed to prevent leakage of fuel into the interior of the cylinder. The dimensions of the parts of the governor weight and the material from which it is made are so selected that the governor weight has an equivalent density of not more than 5 times and preferably about twice the density of the fuel.

Yet another form of governor weight is shown comprising a part 50 provided with bearing bush 51 by which the governor weight is mounted on a carrier 17 and having a lateral finger 52 through which the governor weight acts on the valve 23. The part 50 of the weight is suitably formed of aluminium, and has an internally screwed extension 53 on the side of the pivot 51 remote from the part 50. A brass lead or equivalent high density insert 54 is retained in the extension 53 by being externally screwed. The dimensions of the parts of the governor weight and the materials are so selected as to provide a weight which has an effective density of not more than 5 and preferably twice the density of the fuel.

In order to obtain the necessary governor force equivalent to that exerted by the known governor weights, a larger number of governor weights will be required or alternatively the area of the diaphragm 28 may be reduced.

I claim:

1. A fuel metering device for an internal combustion engine comprising a fuel inlet, fuel pressurizing means arranged to receive fuel from said fuel inlet, a fuel outlet, a first orifice means through which fuel flows from the fuel pressurizing means to said fuel outlet, a chamber containing fuel pressurized by said pressurizing means, a centrifugal governor adapted to be driven by the engine and having governor weights in said chamber, second orifice means in series with said first orifice means through which fuel flows from the fuel pressurizing means to said fuel outlet, a pressure-responsive element subjected to the pressure differential across the second orifice means, and valve means to cooperate with said first orifice means and loaded by the pressure-responsive element in the sense to close the valve on increase of the pressure differential to which the pressure-responsive element is subjected, said valve means being loaded by the centrifugal governor in the sense to open the valve on increase of the engine rotational speed, whereby the volume flow of fuel through said second orifice means is regulated to be directly proportional to the engine rotational speed; characterised in that the governor weights have an effective density not exceeding five times the density of the fuel whereby as the fuel density is increased the volume flow through the second orifice means is correspondingly decreased thereby to compensate at least in part for the increase in mass flow of fuel due to the increase in the fuel density.

2. A fuel metering device according to claim 1 wherein the governor weights have an effective density of approximately twice the density of the fuel.

3. A fuel metering device according to claim 1 wherein the governor weights are solid and are made from a material having a density not exceeding five times the density of the fuel.

4. A fuel metering device according to claim 1 wherein the governor weights are made, at least partly, from a material having a density exceeding five times the density of the fuel and are hollow so that the effective density of the governor weights does not exceed five times the density of the fuel.

CHRISTOPHER LINLEY JOHNSON.

REFERENCES CITED

The following references are of record in the file of this patent:

UNITED STATES PATENTS

| Number | Name | Date |
|---|---|---|
| 2,229,681 | Sorensen | Jan. 28, 1941 |
| 2,412,289 | Pugh et al. | Dec. 10, 1946 |
| 2,414,617 | Summers | Jan. 21, 1947 |
| 2,479,813 | Chamberlin et al. | Aug. 23, 1949 |
| 2,485,525 | Bedale | Oct. 18, 1949 |
| 2,531,780 | Mock | Nov. 28, 1950 |

FOREIGN PATENTS

| Number | Country | Date |
|---|---|---|
| 526,998 | Great Britain | Sept. 30, 1940 |
| 560,196 | Great Britain | Mar. 24, 1944 |
| 611,312 | Great Britain | Oct. 28, 1948 |